Figure 3:
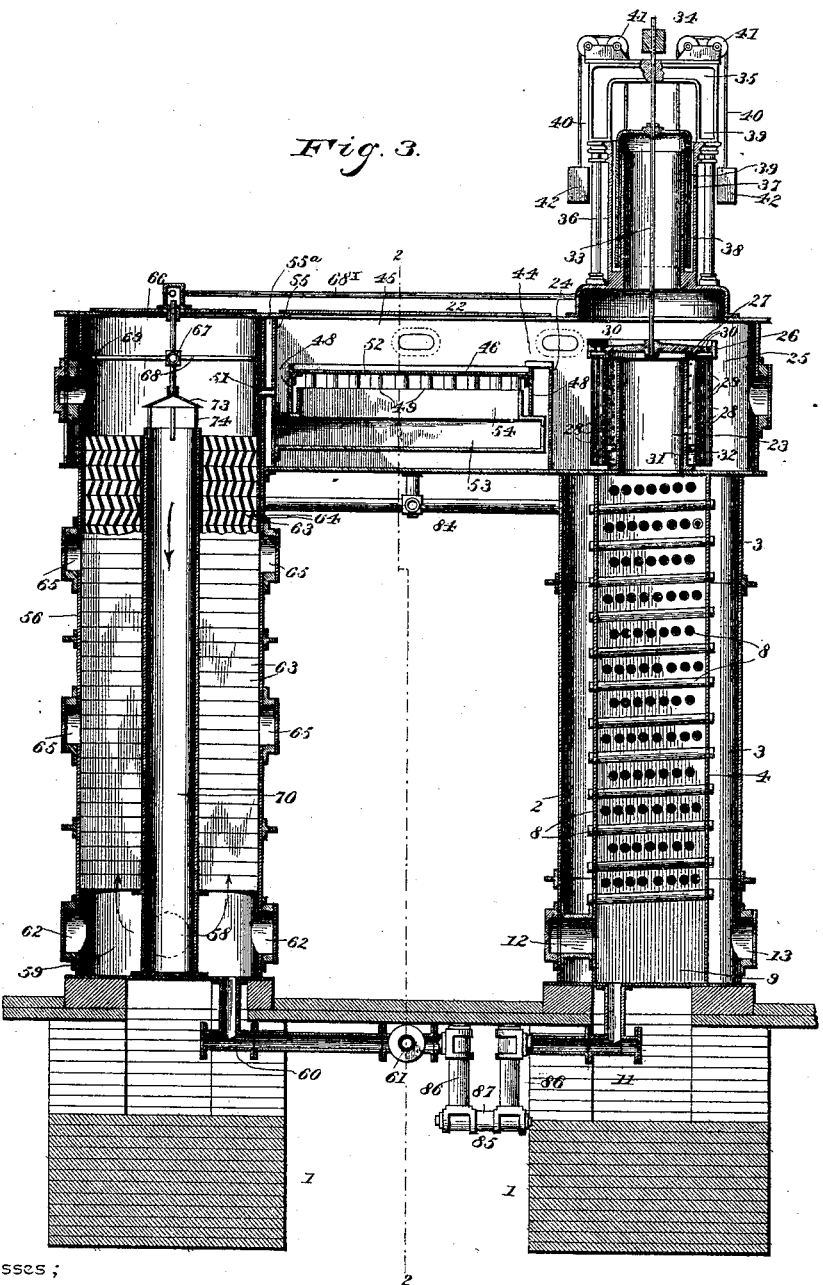

(No Model.) 4 Sheets—Sheet 1.
G. SCHARFE.
GAS PURIFIER AND CONDENSER.
No. 482,141. Patented Sept. 6, 1892.
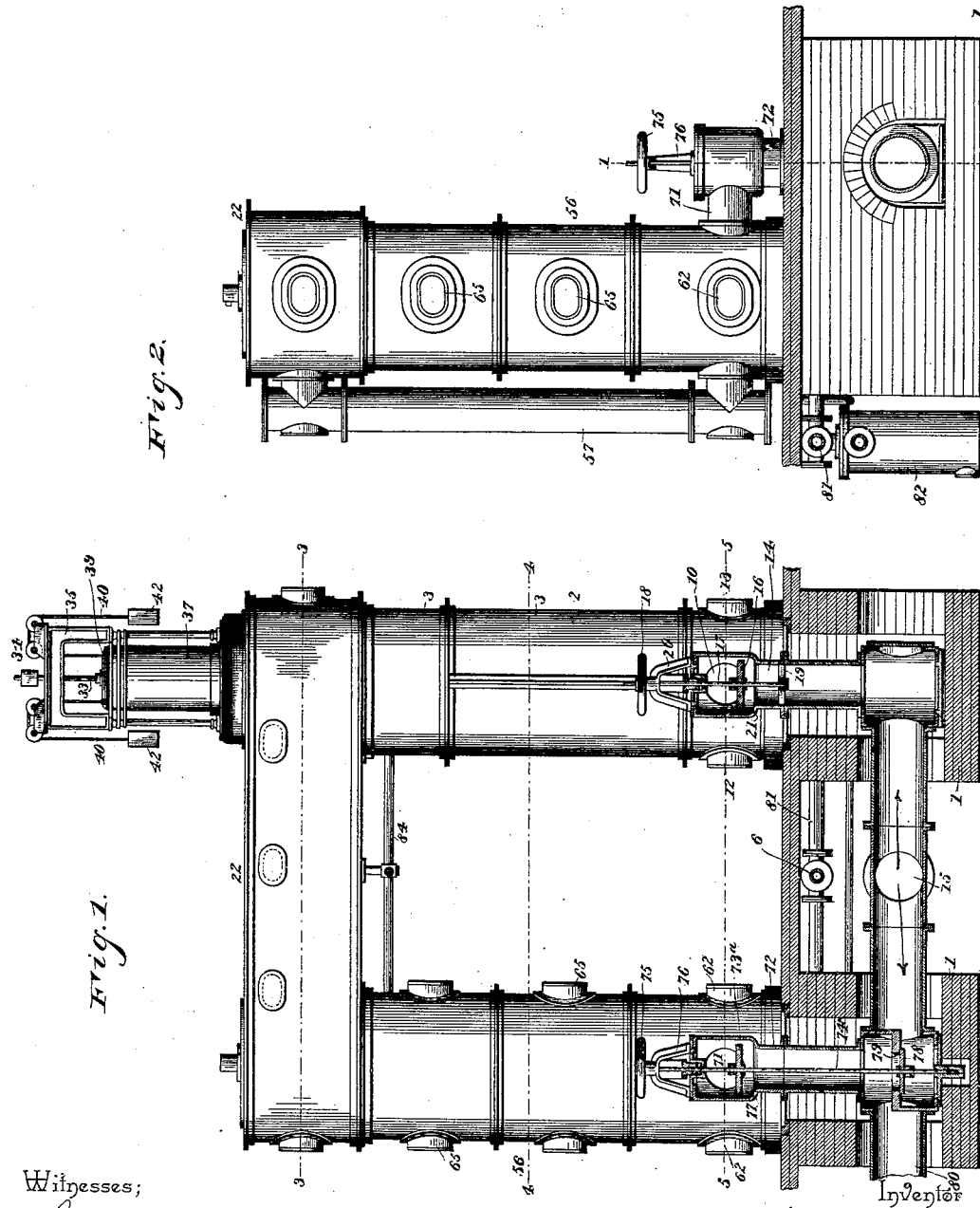

(No Model.) 4 Sheets—Sheet 2.

G. SCHARFE.
GAS PURIFIER AND CONDENSER.

No. 482,141. Patented Sept. 6, 1892.

Witnesses:
J. M. Withers
D. P. Wolhaupter

Inventor,
Gottlieb Scharfe,
By his Attorneys,
C. A. Snow & Co.

(No Model.) 4 Sheets—Sheet 3.
G. SCHARFE.
GAS PURIFIER AND CONDENSER.
No. 482,141. Patented Sept. 6, 1892.
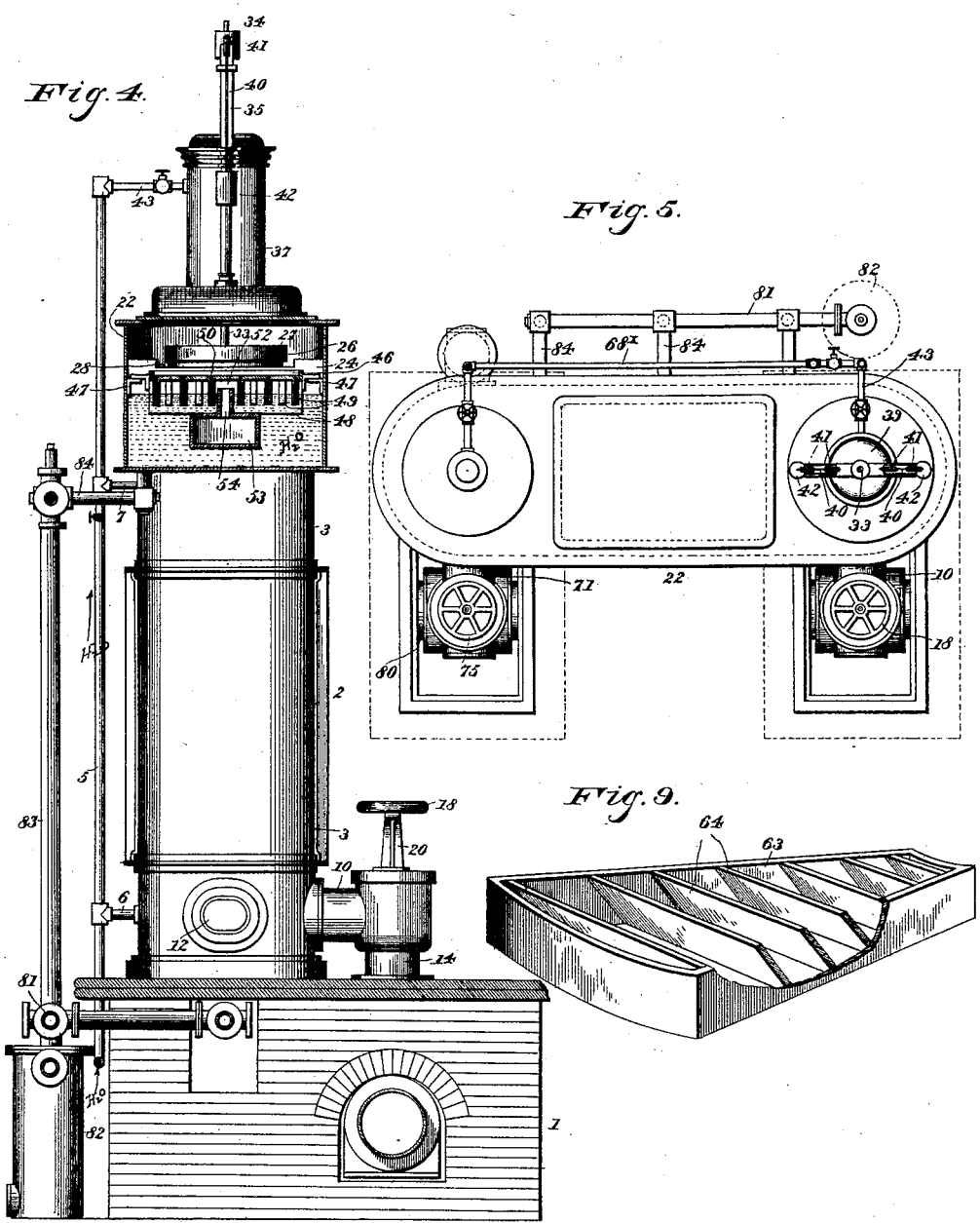
Witnesses:
Inventor,
Gottlieb Scharfe,
By his Attorneys,
C. A. Snow & Co.

(No Model.) 4 Sheets—Sheet 4.
G. SCHARFE.
GAS PURIFIER AND CONDENSER.
No. 482,141. Patented Sept. 6, 1892.
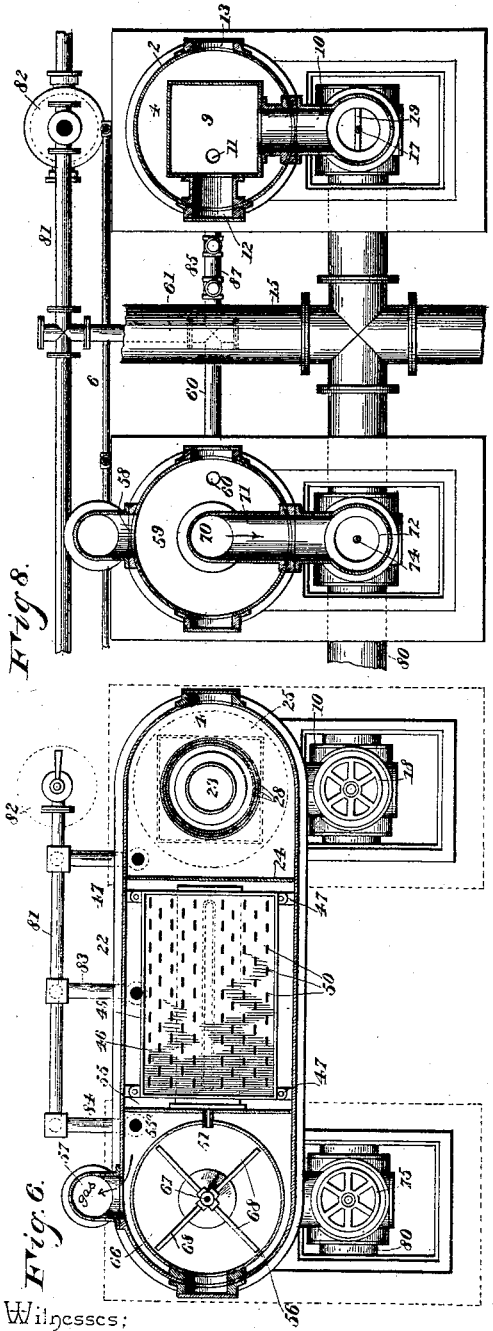

UNITED STATES PATENT OFFICE.

GOTTLIEB SCHARFE, OF ANNAPOLIS, MARYLAND.

GAS PURIFIER AND CONDENSER.

SPECIFICATION forming part of Letters Patent No. 482,141, dated September 6, 1892.

Application filed July 13, 1891. Serial No. 399,383. (No model.)

*To all whom it may concern:*

Be it known that I, GOTTLIEB SCHARFE, a citizen of the United States, residing at Annapolis, in the county of Anne Arundel and State of Maryland, have invented a new and useful Gas Purifier and Condenser, of which the following is a specification.

My invention relates to an improvement in gas purifiers and condensers; and it has for its object to provide an apparatus that will thoroughly cleanse the gas as it comes from the retorts or generators and will effectively separate by condensation tar, and other heavy hydrocarbons with which the gas is impregnated and is desired to be separated from, allowing the lighter gases to pass on through the purifier and be submitted to a succession of purifying and condensing steps, which cause the purification and condensation to be complete; and the same consists of a succession of cooling-chambers provided with cooling and condensing means, to which the gas has a circuitous passage and which are provided with special details of construction and arranged in the novel combination, as will be hereinafter more fully described, illustrated in the accompanying drawings, and specifically pointed out in the appended claims.

In the accompanying drawings, Figure 1 is front elevation and a sectional view on the line 1 1 of Fig. 2 of a gas purifier and condenser constructed in accordance with my invention. Fig. 2 is a side elevation of the same. Fig. 3 is a vertical longitudinal sectional view of the complete apparatus. Fig. 4 is a sectional view on the line 2 2 of Fig. 3. Fig. 5 is a top plan view of the apparatus. Fig. 6 is a horizontal section on the line 3 3 of Fig. 1. Fig. 7 is a similar view on the line 4 4 of Fig. 1. Fig. 8 is a similar view on the line 5 5 of Fig. 1. Fig. 9 is a detail in perspective of one of the purifier-sectors.

Referring to the accompanying drawings, 1 designates a suitable foundation or bed, upon which is suitably mounted the vertical cylinder 2, which is preferably constructed in the sections 3 in order that access may be easily gained thereto for the purposes of cleaning as well as removal. Within this cylinder or chamber is a second smaller cylinder or chamber 4, around which and within the space inclosed between said chamber and the outer cylinder there is a free circulation of water, which is admitted from the water-supply pipe 5, connected thereto at the bottom by the connection 6 and at the top by the connection 7, thus providing a free circulation of water through the inclosed space and around the inner cylinder or chamber. The inner cylinder or chamber 4 is provided through its entire length with a series of horizontal circulating-pipes 8, which are placed at right angles to each other and form a network of cooling-pipes, through which the gas in its upward passage permeates and is cooled and condensed and relieved of the undesirable substances, the right-angularly-disposed circulation-pipes being in communication with the inclosed water-space. Between the bottom tier of circulation-pipes 8 and the bottom of the inner chamber is left a space or box 9, into which the supply of gas is admitted through the pipe 10, while the tar, heavy hydrocarbons, and water of condensation escape from said box through the drain-pipe 11, communicating with the bottom thereof. A manhole 12 also communicates from the outside of the main cooling cylinder or chamber with said space, located in the bottom of said inner cylinder, in order that access may be gained thereto for the purposes of manual cleaning and inspection. For the same purposes the main cylinder 2 is provided with the manhole 13. The gas is admitted to this inner cooling-chamber through the supply-pipe 10, which is in communication with the main supply-pipe 14, which passes beneath the foundation or bed upon which the main cylinder is mounted and connects with the retort or generator pipe 15, which conducts the gas manufactured therein to the purifying apparatus.

Located within the vertical section of the supply-pipe and at its joint with the pipe 10, communicating with the interior of the inner cooling-chamber, is the valve 16, mounted upon the stem 17, and is operated by the hand-wheel 18, working thereon, said stem being supported within the supply-pipe by the cross-brace 19 and the bracket 20, located at the upper terminal of the same and without the pipe, the valve referred to being adapted to seat itself upon the shoulder 21, located directly beneath the opening in the connection 10 with the main supply-pipe 14.

Directly upon the cylinders 2 and 4 and horizontally thereover is the supplemental purifying-chamber 22, into which the gas is conducted from the first cooling-chamber 4 through the pipe 23, communicating with the upper end of said cooling-cylinder and the interior of the supplemental chamber 22. The chamber 22 is partitioned off by the partition 24 and forms a purifying-space 25 directly around the communicating pipe 23, said space being designed to be filled with water. Within this space and directly over said supply-pipe 23 and inclosing the same is a cover 26, which regulates the amount of gas supplied to the interior of chamber 22, and also materially assists in the purification and condensation. Said cover consists of a top cap 27, extending horizontally across the mouth of supply-pipe 23, and is provided with a series of depending circular plates 28, surrounding and inclosing the supply-pipe 23. Each of plates 28, which are preferably three in number, is provided with a series of gas-escape openings 29, which do not register with each other and which cause the gas in passing therethrough in its escape through the water within the chamber 25 to pass around and within the said plates to find its egress through said holes, and thus is additionally subjected to purification by said water. Communicating with the spaces inclosed by plates 26 is a series of perforations 30, located around near the top edge of the cap 27, which permits the water which is supplied from above, which will be described, to pass through the same and within the plates, thus filling the spaces between the plates with water and cooling the same, and consequently the gas, before it can find its escape therethrough. Said plates are kept off from the supply-pipe 23 by means of the small guide-rollers 31, secured within the brackets 32, located near the bottom edge of the inner inclosing plate, and thus guides and facilitates the movement of the cover 26 as it rises and falls, according to the pressure of gas, and thus regulates the amount supplied within the chambers 22 and 25.

The cap 27 of the inclosing cover 26 is connected by means of the rod 33 to the regulator 34, mounted on the outside and top of chamber 22. The upper end of said rod works through and is supported within the top of the bracket 35, upon which is mounted the regulating devices, and within said frame or bracket 35 is mounted the upright cylinder 36, which is provided with the outer and inner walls 37 and 38, inclosing a space within which works the inverted cylinder 39, which is rigidly secured to the shaft 33 and within the frame 35. Ropes or chains 40 are connected to the top of said inverted cylinder and pass over the pulleys 41, located on the top of the frame 35, and are provided at their lower ends with the weights 42, which, together with the weight of the inverted cylinder and the stem upon which it is mounted, equally balances the weight of the cover 26, inclosing the supply-pipe 23, and thus exactly counterbalances the same and regulates the amount of gas introduced within the cylinder 22, according to the amount of pressure exerted upon the cover 26 by the gas in its escape from the cooling-chamber 4. Water is admitted to the spaces inclosed by the walls 37 and 38 of said regulator through the pipe 43, communicating with the main water-supply pipe 5, and when the water has filled the inclosing space it overruns the inner wall 38, which is somewhat shorter than the outer wall 37, and falls down and fills up the space 25 around the supply-pipe 23, communicating therewith, and in its passage falls directly upon the cap 27 of the inclosing cover 26, thus cooling the same, and also passes through the holes located therein and communicating with the spaces inclosed between the plates 28, thus keeping all the parts with which the gas comes in contact in a cool condition. After the gas has escaped through the perforations in the series of plates 29 in a quantity regulated according to its pressure it passes through the passage 44, directly above the partition 24, into the opposite cooling-chamber 45 of the main chamber 22.

Located within the chamber 45 is a pan 46, supported upon the side brackets 47 and provided with the depending sides 48 and with a series of depending tubes 49, communicating with the slotted perforations 50 in the face of the pan or plate, said tubes being somewhat shorter in length than the sides of said pan, the chamber 45 being designed to be filled with water by the overflow from the chamber 25 up to the point of its overflow-outlet 51, thus having the water at a height that covers the lower ends of said depending tubes 49 and causing the gas in seeking an escape to pass through said perforations and depending tubes and bubble through the water surrounding the same and collect within the space 52, beneath the top of said plate, and inclosed by the depending sides of the same, which are of greater length than said depending tubes.

Directly beneath the plate 46 is a supplemental gas-conducting chamber 53, upon the top of which the depending sides of the plate are designed to rest and additionally support the same. Chamber 53 is provided with an elongated ingress-tube 54, situated centrally along the top side of the same and projecting up within the space 52 beneath said perforated and tubed plate, thus providing an escape for the gas from this point, which, passing through said elongated tube, escapes into the chamber 53, which communicates with the space 55$^a$, inclosed by the jacket 55, with which the upper end of the second upright purifying-cylinder 56 is provided, said jacket extending, as said, only around the upper end of cylinder 56, and communicates with the gas-conducting pipe 57, which, passing downward the full length of the cylinder, communicates again with the same at its lower edge through the opening 58, which communicates with the bottom space or box 59, corresponding somewhat to the space 9 in the first cooling-chamber. The drain-pipe 60 communicates with the interior of said space or box and communicates with the common drain-pipe 61, with which the pipe 11, communicating with the space or box 9, is in communication, and thus provides an escape for foreign matter, while access is had to the interior of said space through the manholes 62, located in the sides of the cylinder 56. The gas upon entering said space or box 59 begins an upward ascent through a series of purifying-sectors 63, which are placed entirely around and within the cylinder 56, leaving in the center a circular space for the purposes as will be directly described. Sectors 63 are suitably bolted together within the chamber 56 and are provided with a series of diagonal plates 64, which are parallel with each other, and the opening on both faces of said sectors registering exactly and being in communication with the corresponding openings in each successive sector, while the plates in each sector are not in a direct line with each other or diagonal in one direction, but are alternately arranged, so that when the same are placed upon each other a zigzag course is provided for the gas through the various channels of the sectors, access being had to the same for the purpose of cleaning, removal, or placing within by means of a series of manholes 65, located in the sides of said cylinder 56.

Above the top tier of sectors the cylinder 56 is provided with a space 66, within which is located a revolving sprinkler 67, which is provided with a series of horizontal arms 68, having lateral end openings 69, through which the water escapes and causes the said sprinkler to revolve and throw the water against the sides of the space 66 and within the whole upper end of said cylinder, thus causing the water to trickle down through the diagonally-arranged sector-plates 64, and thus thrown in direct contact with the ascending gas, which is further relieved of impurities, which are carried by the water to the bottom of said cylinder, from which it escapes through the drain-pipe 60. Water is supplied to the sprinkler 67 through the pipe $68^\times$, in connection with the main water-supply pipe 5.

Centrally located within the cylinder 56 is the gas-conducting tube 70, which extends down through the circular opening left by the circularly-arranged sectors, and is designed to conduct the gas after having passed up through the sectors down to the escape-pipe 71, communicating with the bottom thereof, and passing through the cylinder 56 and connecting with the main outlet-pipe 72. Secured to the upper end of tube 70 within the cylinder 56 is a deflecting-plate 73, mounted and supported by suitable brackets 74, and acts both as a shield to deflect the water and keep the same from the tube 70 and furnishes a bearing for the end of the sprinkling-tubes 67.

The main outlet-pipe 72 at its connection with the pipe 71, communicating with the gas-conducting pipe 70, is provided with a valve $73^a$, which is mounted upon the stem $74^a$, extending up through the upper end of said pipe, and is operated by the hand-wheel 75, working on the upper end thereof, which extends and is supported in the bracket 76, corresponding with the bracket 20, located in the top of the supply-pipe 14, said valve being designed to seat itself upon the shoulder or seat 77, located within the outlet-tube directly beneath its connection with the tube 71. The lower extremity of said valve-stem $74^a$ is provided with a supplemental valve 78, that is designed to be seated against the valve-seat and partition 79, located at the lower end of pipe 72, and controls the direction of the gas through and to the main outlet-pipe 80, which conducts the gas to the desired point for utilization. The object of these double valves on the same valve-stem is to permit the gas to pass directly from the supply-pipe 15 from the retort or generator through the main outlet pipe or passage 80 without passing through the purifying cylinders or chambers, the valves controlling the openings communicating directly with said chambers being, of course, closed, while the valve 78 would be thrown open, and thus allow a free and uninterrupted passage of the gas to the source of use.

The drain-pipes 60 and 11 communicate with the bottom of the purifying-cylinders 4 and 56 and conduct the foreign matter and water of condensation through the same to the main drain-pipe 81, which is in communication with the drain-collecting cylinder 82, pipes 83 and 84 also placing the same in communication with the bottom of chamber 45, which can also be drained, as desired, the overflow of water in said chamber 45 through the outlet 51, previously referred to, being utilized by passing through into the chamber 66, located in the top of the cylinder 56, and trickling down through the sectors therein.

The operation of this apparatus is thought to be apparent from the foregoing description. The gas entering from the retort or generator into the cylinder 4 is subjected to its first stage of purification, and passes up through this cooling-cylinder and through the network of right-angularly arranged circulating-pipes therein. Leaving this cylinder, it passes up and under a continuously-cooled cover inclosing the outlet of this cylinder, and, according to the amount of pressure, the same escapes through alternately-arranged perforations in the sides of this cover, which is evenly balanced with an ordinary regulator. Passing over the water in this chamber, the gas next strikes a perforated pan or plate provided with extended tubes depending beneath the water. Bubbling through the water after leaving these tubes, the gas finds its escape through a conducting-chamber located beneath this tubed pan or plate and finds escape around the top of the second cooling-chamber through an inclosed space and down through a conducting-pipe that communicates with the lower end of said chamber. The gas now passes up through a series of sectors arranged the full length of the cylinder and down which trickles a stream of water supplied by a rotating sprinkler and the overflow from the top purifying-chamber, finally escaping downwardly through a tube running the length of the second cooling-chamber, and passes out through the main outlet-pipe.

Inasmuch as the drain-pipes 60 and 11 of the two purifying-cylinders communicating with each other and a common-drain center 61 are directly in communication with each other, to avoid the possibility of the impure gas which enters the first cylinder or purifying-chamber from entering the second cylinder 56 under the impulse of pressure before the same has been subjected to purification, I provide the drain-pipe 11 intermediate of its joint with the horizontal portion connecting with the common drain 61 with a hydraulic closer or cut-off 85, which effectually obviates this objection. The said hydraulic closer or cut-off 85 consists of depending nippled connections 86, connected together at their bottom by a cross-nipple 87, which together forms a depending U-shaped portion, which constitutes the closer. The same derives and fills itself principally with the water from the cylinder 56, which, trickling down through the sectors therein, finds exit through the drain-pipe 60, communicating with the closer, which when sufficiently filled prevents any gas from the first purifying-cylinder from passing therethrough and allows nothing but the condensed water and the other products of condensation from finding exit therethrough. The water in the closer always maintains the same level, and the accumulation of the condensed products from the first purifying-cylinder, together with the slight pressure which the entering gas may exert thereon, is sufficient to force the fluids around through the closer and out through the common-drain exit, while at the same time, as stated, the pressure of gas would not be sufficient in itself to force a passage down through the depending U-shaped closer or cut-off.

Having thus described my invention, what I claim, and desire to secure by Letters Patent, is—

1. In a gas-condenser, an outer inclosing cylinder, an inner independent condensing-chamber provided with separate series of circulating-pipes arranged in a horizontal series at right angles one above the other, a supplemental cooling-chamber above said condenser, an outlet-pipe communicating with the interior thereof and said condenser directly over the network of circulating-pipes therein, a cover inclosing said outlet-pipe and provided with a series of lateral perforations, a regulator connected to said cover, drain-pipes connected with said condenser and cooling-chamber, a hydraulic gas closer or cut-off located in the drain-pipe from said condensing-chamber, and water-supply pipes, substantially as set forth.

2. In a gas-condenser, an outer inclosing cylinder, an inner condensing-chamber provided with a series of water-circulating pipes communicating with the inclosed water-space between said condensing-chamber and the outer cylinder, a supplemental cooling-chamber above said cylinder and inclosed condensing-chamber, an outlet-pipe communicating with the interior thereof and said condensing-chamber directly above the network of circulating-pipes therein, a cover inclosing said outlet-pipe and consisting of an annularly-flanged top cap and a series of depending spaced plates provided with an alternate series of lateral perforations, said cap being further provided with a circular series of perforations within the flange thereof and communicating with the spaces inclosed by said plates, a regulator connected to said cover, and water-supply pipes, substantially as set forth.

3. In a gas-condenser, the combination of an outer inclosing cylinder, an inner condensing-chamber provided with a series of water-circulating pipes, a supplemental cooling-chamber above said cylinder and condenser, an outlet-pipe communicating with the interior thereof and said condenser and projecting into said cooling-chamber, a laterally-perforated cover inclosing said upwardly-projecting pipe and provided with a circular series of perforations in the top thereof, a supplemental open water-cylinder located above said cooling-chamber and said cover and provided with an outer wall and a shorter inner wall forming an open water-space between the same, the overflow from said space being over said shorter wall upon said perforated cover in the cooling-chamber, an inverted weight-regulated cylinder working within said water-space and connected with said cover, and water-supply pipes connected with said upper open water-space and said inclosing cylinder, substantially as set forth.

4. In a gas purifier and condenser, the combination of a cooling-chamber having a gas-inlet and an inclosed gas-space above the water-line, a closed escape pipe or duct below and communicating with said gas-space and leading therefrom, a purifying and condensing cylinder provided with a top inclosing jacket surrounding the entire upper end of the same and connected with said escape pipe or duct, a downwardly-extending pipe connecting said jacket with the bottom inlet of the cylinder, a series of independent and removable sectors arranged in a circle one above the other within the cylinder and each provided with diagonally-arranged plates alternately disposed with each succeeding sector, forming a zigzag passage through the cylinder, an automatically-revolving water sprinkler or distributer located above said sectors within the top of said cylinder, an escape-pipe centrally located within said cylinder and passing down between and supporting said sectors and communicating with the bottom outlet, a deflecting-plate supported above the top open end of said escape-pipe and forming a bearing for the lower end of said sprinkler, and an overflow-pipe connecting said cooling-chamber with the upper end of said cylinder, substantially as set forth.

5. In an apparatus of the class described, a purifying-chamber, a pan or plate located within said chamber and provided with a series of perforations, depending sides, and depending tubes inclosed within said sides and communicating with said openings and extending below said pan, and an escape pipe and duct provided with an upwardly-extending elongated escape-tube projecting up between said tubes and communicating with the space above the water-line, inclosed by said pan or plate and water supply and circulating pipes, substantially as set forth.

6. In an apparatus of the class described, a purifying-chamber provided with communicating compartments separated by a short partition-wall, a supply-pipe inwardly extending within one of said compartments, a cover inclosing said pipe, the same consisting of a top cap and a series of spaced plates depending therefrom and provided with a series of alternately-arranged perforations in the sides thereof, and guide-rollers secured to the bottom edge of the inner inclosing plate, a regulator connected to said cover, a pan or plate supported within the opposite compartment and provided with a series of slotted openings and depending tubes connected therewith, and an escape-chamber arranged horizontally thereunder and provided with an elongated escape-tube communicating with the space above the water-line inclosed by said pan or plate, substantially as set forth.

7. In a gas purifier and condenser, a condensing-chamber provided with circulating-pipes surrounded by a water-space, a supplemental chamber arranged thereover and communicating therewith and provided with two compartments, a gas regulator and purifier within one compartment, a tubed plate and an escape chamber and duct located under said plate in the other, a purifying and condensing cylinder provided with a top inclosing jacket communicating with said escape chamber and duct and the bottom inlet to said cylinder, drain-pipes communicating with the several purifiers, a hydraulic gas closer or cut-off located in said drain-pipes, valved supply and outlet pipes communicating with both cylinders and a common supply, and water-circulation pipes communicating with the various chambers, substantially as set forth.

8. In a gas purifier and condenser, the combination, with communicating purifying and condensing chambers and drain-pipes connecting the same with a common-drain center, of a hydraulic gas-closer located in said drain-pipes intermediate of the purifying-chambers, the same consisting of a U-shaped portion depending beneath the horizontal plane of said drain-pipes and designed to be normally filled with the drain-water and condensed products, substantially as set forth.

In testimony that I claim the foregoing as my own I have hereto affixed my signature in the presence of two witnesses.

GOTTLIEB SCHARFE.

Witnesses:
   THS. KELL BRADFORD,
   A. W. BRADFORD.